(12) United States Patent
Inoshita

(10) Patent No.: US 11,144,781 B2
(45) Date of Patent: Oct. 12, 2021

(54) IMAGE PROCESSING APPARATUS, IMAGE PROCESSING METHOD, AND STORAGE MEDIUM TO ESTIMATE REFLECTION CHARACTERISTIC OF OBJECT

(71) Applicant: CANON KABUSHIKI KAISHA, Tokyo (JP)

(72) Inventor: Chika Inoshita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/523,337

(22) Filed: Jul. 26, 2019

(65) Prior Publication Data
US 2020/0034652 A1 Jan. 30, 2020

(30) Foreign Application Priority Data
Jul. 30, 2018 (JP) .............................. JP2018-142032

(51) Int. Cl.
| | | |
|---|---|---|
| *G06K 9/62* | (2006.01) | |
| *G06K 9/46* | (2006.01) | |
| *G06K 9/52* | (2006.01) | |
| *G06T 7/60* | (2017.01) | |
| *G06T 1/00* | (2006.01) | |

(52) U.S. Cl.
CPC ............. *G06K 9/6209* (2013.01); *G06K 9/52* (2013.01); *G06T 1/0007* (2013.01); *G06T 7/60* (2013.01); *G06T 2200/24* (2013.01)

(58) Field of Classification Search
None
See application file for complete search history.

(56) References Cited

U.S. PATENT DOCUMENTS

| | | | | | |
|---|---|---|---|---|---|
| 5,313,568 A | * | 5/1994 | Wallace | ................... | G06T 15/55 345/420 |
| 2003/0035098 A1 | * | 2/2003 | Ishiyama | ........... | G06K 9/00248 356/72 |
| 2009/0011948 A1 | * | 1/2009 | Unlu | ....................... | G01N 21/77 506/9 |
| 2010/0315422 A1 | * | 12/2010 | Andre | ..................... | G06T 7/521 345/426 |
| 2013/0208987 A1 | * | 8/2013 | Nehse | ................... | G06K 9/4604 382/199 |

(Continued)

FOREIGN PATENT DOCUMENTS

JP 2003-067772 A 3/2003

*Primary Examiner* — Randolph I Chu
(74) *Attorney, Agent, or Firm* — Canon U.S.A., Inc. IP Division

(57) ABSTRACT

An image processing apparatus includes first and second acquisition units, a determination unit, and an estimation unit. The first acquisition unit is configured to acquire shape information of an object. The second acquisition unit is configured to acquire a plurality of pieces of image data. The determination unit is configured to determine a pixel position corresponding to a position at which an orientation of a surface is the same as or similar to an orientation of a surface at a position of interest on the object, as a pixel position for estimating a reflection characteristic of the object at the position of interest. The estimation unit is configured to estimate the reflection characteristic of the object at the position of interest by using a pixel value at the pixel position determined by the determination unit.

19 Claims, 12 Drawing Sheets

(56) References Cited

U.S. PATENT DOCUMENTS

| | | | |
|---|---|---|---|
| 2014/0301637 A1* | 10/2014 | Jin | G06K 9/6215 |
| | | | 382/162 |
| 2016/0033262 A1* | 2/2016 | Kessler | G01B 11/2513 |
| | | | 348/135 |
| 2016/0101643 A1* | 4/2016 | Cape | G02B 30/27 |
| | | | 359/627 |
| 2016/0154102 A1* | 6/2016 | Furxhi | G01S 13/34 |
| | | | 342/59 |
| 2018/0186082 A1* | 7/2018 | Randhawa | B23K 26/125 |
| 2018/0195858 A1* | 7/2018 | Nishikawa | G01B 21/045 |
| 2018/0268542 A1* | 9/2018 | Holmes | A61B 5/02007 |
| 2019/0226836 A1* | 7/2019 | Rudd | G01B 11/2513 |
| 2019/0269363 A1* | 9/2019 | Vilenskii | G01N 21/474 |
| 2019/0317217 A1* | 10/2019 | Day | G01S 17/04 |
| 2019/0355110 A1* | 11/2019 | Cohen | G06T 7/001 |

\* cited by examiner

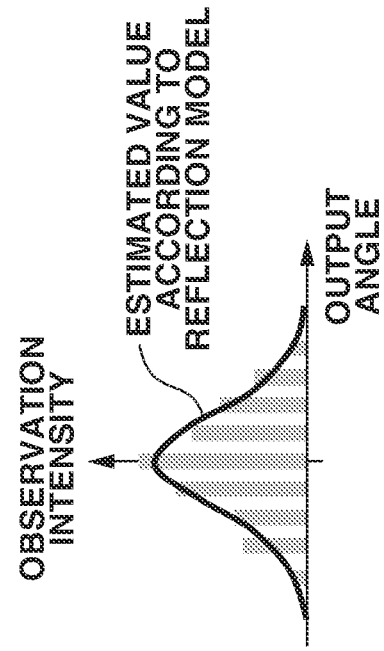
FIG.2A
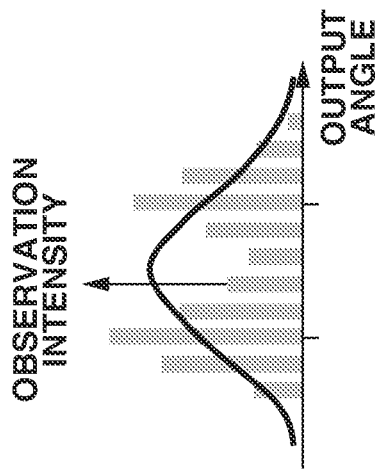
FIG.2B
FIG.2C
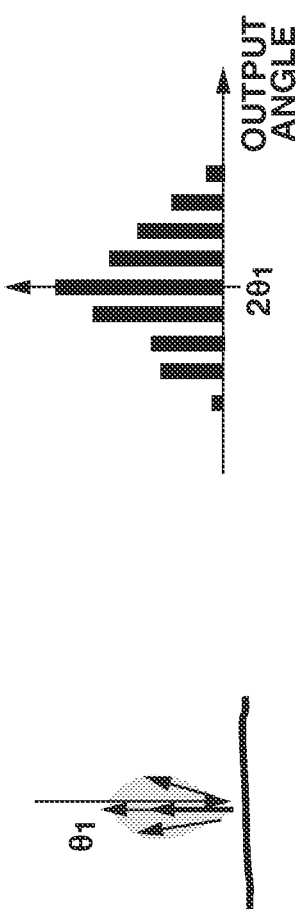
FIG.2D
FIG.2E
FIG.2F

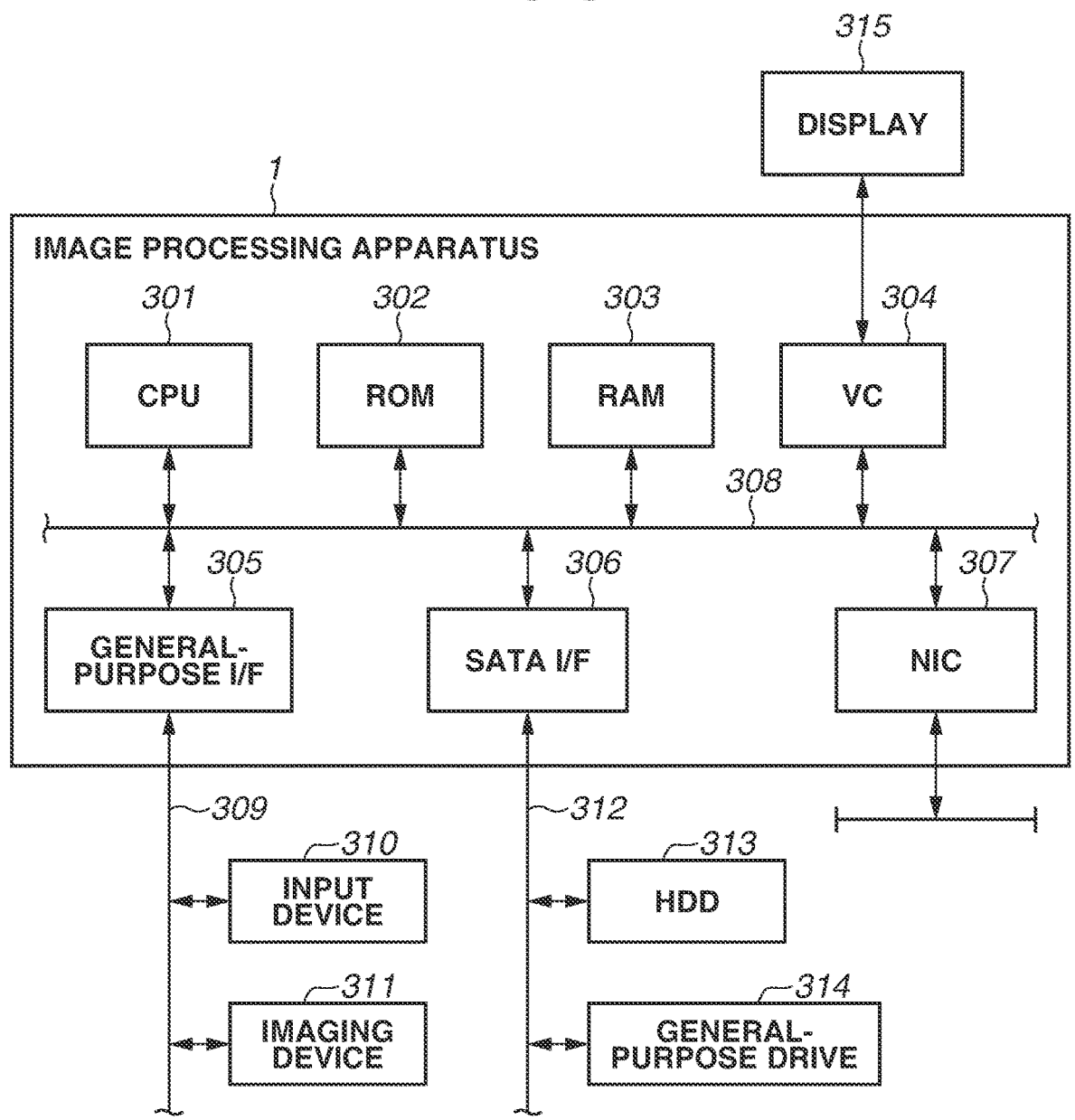

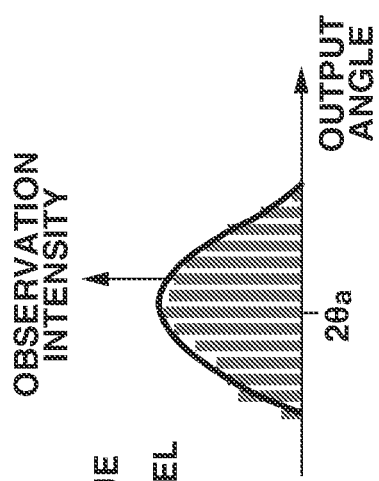
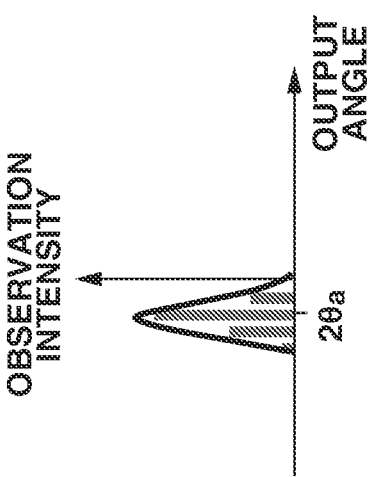
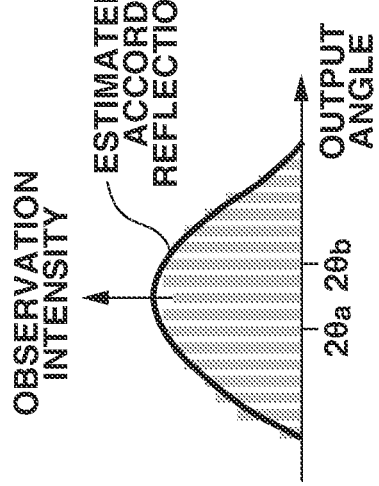
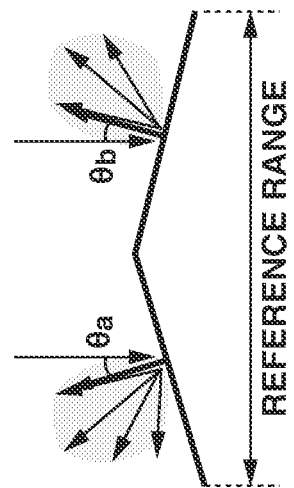
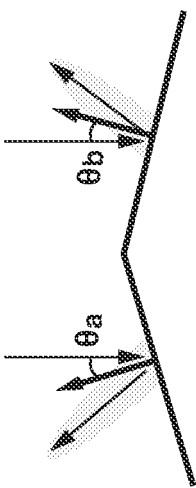

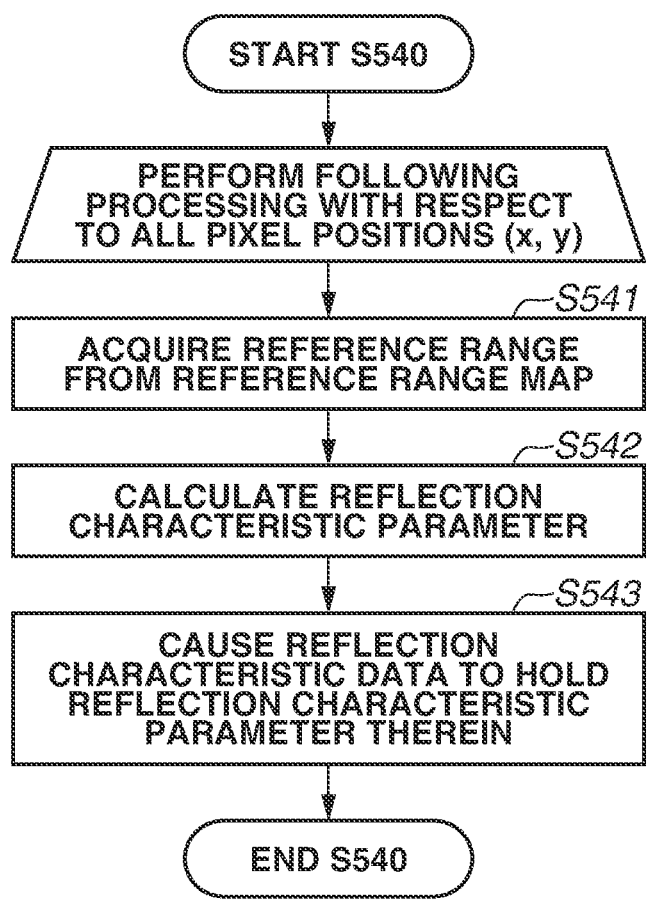

IMAGE PROCESSING APPARATUS, IMAGE PROCESSING METHOD, AND STORAGE MEDIUM TO ESTIMATE REFLECTION CHARACTERISTIC OF OBJECT

BACKGROUND

Field

One disclosed aspect of the embodiments relates to an image processing technique for estimating a reflection characteristic of an object.

Description of the Related Art

There is a known technique for acquiring a behavior of light reflected on an object as a reflection characteristic to reproduce a texture of the object. Japanese Patent Application Laid-Open No. 2003-067772 discloses a technique for estimating the reflection characteristic by grouping a region made of the same material on the object as a single group and approximating a reflection model with use of observed values for each single group.

However, when the reflection model is approximated using the observed values region by region like Japanese Patent Application Laid-Open No. 2003-067772, an observed value unsuitable for the reflection model may be contained in the region depending on the shape of the object. In that case, the reflection characteristic cannot be estimated with high accuracy.

SUMMARY

One aspect of the embodiments is directed to providing image processing for estimating the reflection characteristic of the object with use of an observed value suitable for the reflection model.

According to an aspect of the embodiments, an image processing apparatus includes first and second acquisition units, a determination unit, and an estimation unit. The first acquisition unit is configured to acquire shape information indicating a shape of a surface of an object. The second acquisition unit is configured to acquire a plurality of pieces of image data acquired by imaging the object under a plurality of geometric conditions. The determination unit is configured to determine a pixel position corresponding to a position at which an orientation of a surface is the same as or similar to an orientation of a surface at a position of interest on the object, as a pixel position for estimating a reflection characteristic of the object at the position of interest, in a plurality of images indicated by the plurality of pieces of image data, based on the shape information. The estimation unit is configured to estimate the reflection characteristic of the object at the position of interest by using a pixel value at the pixel position determined by the determination unit.

Further features of the disclosure will become apparent from the following description of exemplary embodiments with reference to the attached drawings.

BRIEF DESCRIPTION OF THE DRAWINGS

FIGS. 2A, 2B, 2C, 2D, 2E, and 2F illustrate estimation of a reflection characteristic regarding each reference range on the object.

FIG. 3 is a block diagram illustrating a hardware configuration of an image processing apparatus.

FIGS. 8A, 8B, 8C, 8D, 8E, and 8F illustrate an influence exerted by a shape of the surface of the object on the estimated reflection characteristic.

FIG. 9 is a flowchart illustrating processing for estimating the reflection characteristic.

DESCRIPTION OF THE EMBODIMENTS

In the following description, exemplary embodiments of the disclosure will be described in detail with reference to the drawings. However, the exemplary embodiments that will be described below are not intended to limit the scope of the claims of the disclosure, and, further, not all of combinations of features described in the exemplary embodiments that will be described below are necessarily essential in constituting the disclosure.

<Problem in Estimation of Reflection Characteristic Using Reflection Model>

In the following description, a first exemplary embodiment will be described. When a reflection characteristic of an object is estimated with use of a reflection model, the reflection model is approximated by pixel values in a plurality of captured images acquired by imaging the object under a plurality of geometric conditions (hereinafter also referred to as observed values). Hereinafter, approximating the reflection model with use of the observed values will also be referred to as fitting. In this case, using the observed values for the fitting, region by region on the object can achieve the fitting with a larger number of observed values than using the observed values for the fitting, point by point on the object. Therefore, this method can reduce an influence of noise contained in the observed values. However, generally, the reflection model subjected to the fitting to the observed values is expressed as a unimodal function having a highest reflectance in a direction of specular reflection with respect to a direction in which light is incident ("unimodal" means that a reflectance has one peak). Therefore, some observed value does not conform to the shape of the reflection model depending on the shape of the surface of the object, and an estimation error is undesirably generated.

Figure 1:
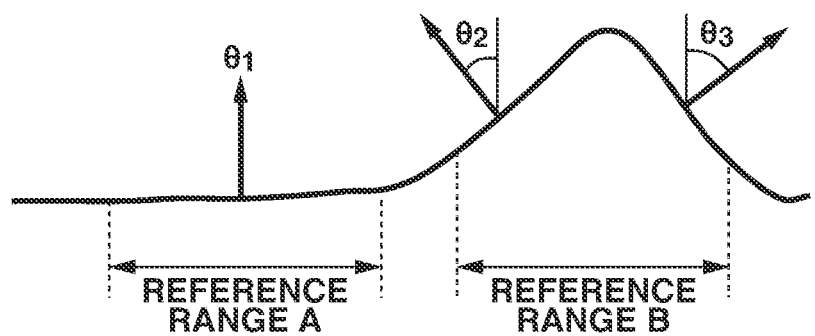
FIG. 1 illustrates one example of an object having a protruding portion on a surface thereof.

FIG. 1 illustrates one example of an object having a protruding portion on a surface thereof. FIGS. 2A to 2F illustrate an example of estimating the reflection characteristic with use of observed values in each of a reference range A and a reference range B illustrated in FIG. 1. FIG. 2A illustrates how reflection occurs when light is incident from a direction perpendicular to the reference range A. FIG. 2B illustrates a result of plotting observed intensities with respect to an output angle of the light regarding the reference range A. In the reference range A, the surface of the object has a normal line with an angle $\theta_1$. The reflected light is intensively reflected in the specular reflection direction, and therefore an observed value at an angle $2\theta_1$ hits a peak among the observed values in the reference range A. FIG. 2C illustrates a result of fitting the reflection model to these observed intensities. FIG. 2D illustrates how reflection occurs when light is incident from a direction perpendicular to the reference range B. FIG. 2E illustrates a result of plotting observed intensities with respect to the output angle of the light regarding the reference range B. In the reference range B, the surface of the object has a normal line at an angle $\theta_2$ and a normal line at an angle $\theta_3$. The reflected light is intensively reflected in the specular reflection direction, i.e., in a direction of an angle $2\theta_2$ on the surface having the normal line at the angle $\theta_2$ and in a direction of an angle $2\theta_3$ on the surface having the normal line at the angle $\theta_3$, and therefore observed values at the two angles, the angles $2\theta_2$ and $2\theta_3$, hit peaks among the observed values in the reference range B. FIG. 2F illustrates a result of fitting the reflection model to these observed intensities. It can be seen in the result of the fitting illustrated in FIG. 2F that the fitting of the unimodal reflection model undesirably leads to generation of an estimation error because the observed values have the plurality of peaks. In this manner, the estimation of the reflection characteristic using the reflection model has a problem that the accuracy of estimating the reflection characteristic undesirably decreases when the observed intensities have the plurality of peaks in the range referred to in order to perform the fitting of the reflection model.

Therefore, in the present exemplary embodiment, similar regions in terms of a normal direction thereof (an orientation of the surface) are set as one reference range based on the shape of the surface of the object, and the reflection characteristic is estimated with use of the observed values for each set reference range. This estimation allows the observed values to have one peak within the reference range, thereby enabling the estimation of the reflection characteristic suitable for the unimodal reflection model.

<Hardware Configuration of Image Processing Apparatus 1>

FIG. 3 is a block diagram illustrating a hardware configuration of an image processing apparatus 1. The image processing apparatus 1 is, for example, a computer, and includes a central processing unit (CPU) 301, a read only memory (ROM) 302, and a random access memory (RAM) 303. Further, the image processing apparatus 1 includes a video card (VC) 304, a general-purpose interface (I/F) 305, a Serial Advanced Technology Attachment (SATA) (serial Advanced Technology Attachment (ATA)) I/F 306, and a network interface card (NIC) 307. The CPU 301 executes an operating system (OS) and various kinds of programs stored in the ROM 302, a hard disk drive (HDD) 313, and the like with use of the RAM 303 as a work memory therefor. The CPU 301 controls each configuration via a system bus 308. For processing according to flowcharts that will be described below, a program code stored in the ROM 302, the HDD 313, or the like is developed into the RAM 303 and executed by the CPU 301. A display 315 is connected to the VC 304. An input device 310, such as a mouse and a keyboard, and an imaging device 311 are connected to the general-purpose I/F 305 via a serial bus 309. The HDD 313, and a general-purpose drive 314, which reads and writes data from and into various kinds of recording media, are connected to the SATA I/F 306 via a serial bus 312. The NIC 307 inputs and outputs information between the image processing apparatus 1 and an external apparatus. The CPU 301 uses the HDD 313 and the various kinds of recording media mounted on the general-purpose drive 314 to store various kinds of data. The CPU 301 displays a graphical user interface (GUI) provided by a program on the display 315, and receives an input such as a user instruction received via the input device 310.

<Logical Configuration of Image Processing Apparatus 1>

Figure 4:
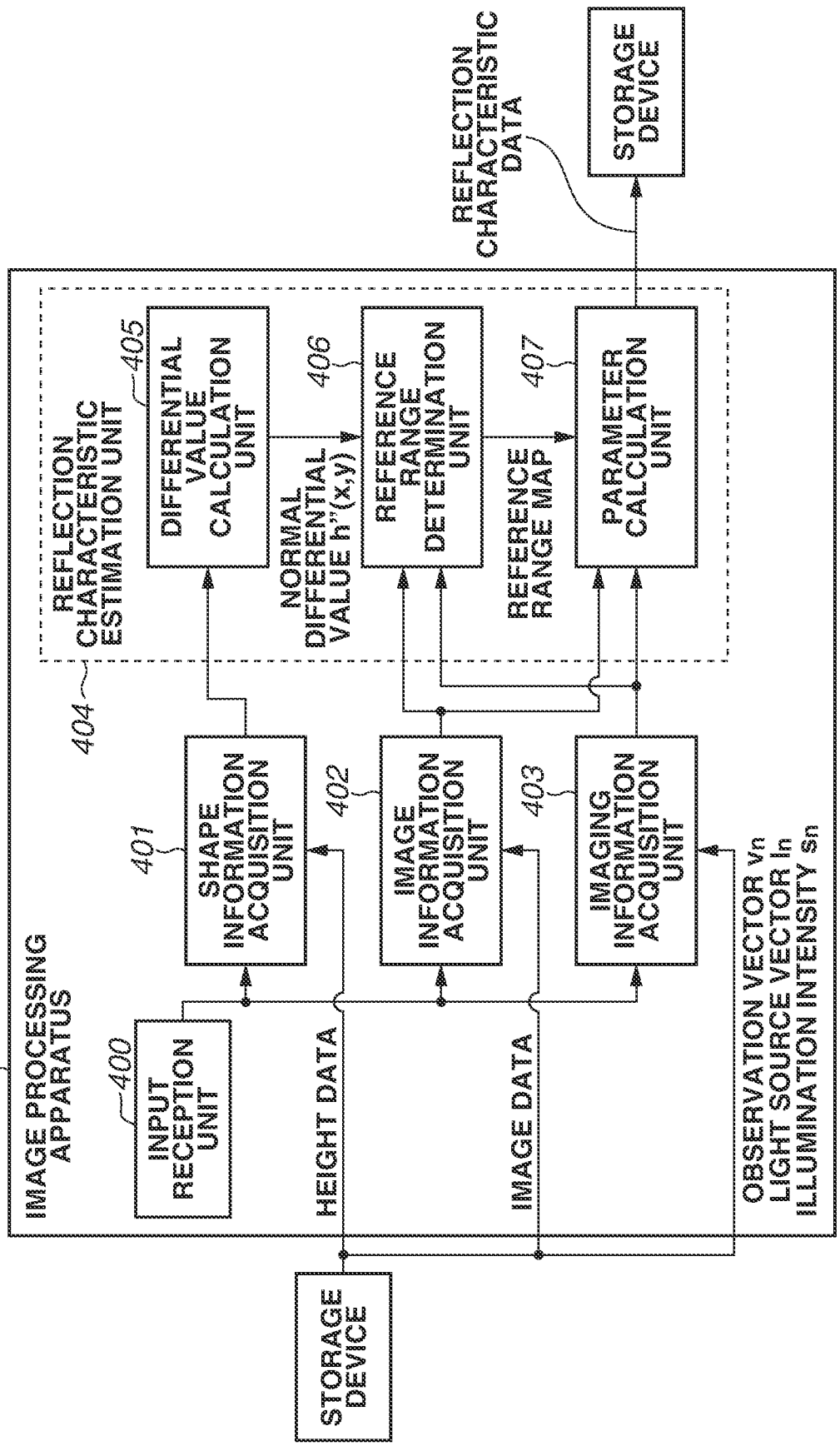
FIG. 4 is a block diagram illustrating a logical configuration of the image processing apparatus.

FIG. 4 is a block diagram illustrating a logical configuration of the image processing apparatus 1. The CPU 301 executes a program or instructions stored in the ROM 302 with use of the RAM 303 as the work memory therefor, in which the image processing apparatus 1 functions as the logical configuration illustrated in FIG. 4, or when the program or instructions are executed by the CPU 301, the CPU 301 performs, or causes image processing apparatus 1 to perform, the operations described in the following such as the flowcharts shown in FIGS. 7, 9, 11, and 12. The processing that will be described below does not have to be entirely performed by the CPU 301, and the image processing apparatus 1 may be configured in such a manner that a part or a whole of the processing is performed by one or a plurality of processing circuits other than the CPU 301.

The image processing apparatus 1 includes an input reception unit 400, a shape information acquisition unit 401, an image information acquisition unit 402, an imaging information acquisition unit 403, and a reflection characteristic estimation unit 404. The input reception unit 400 displays the GUI on the display 315, and receives the instruction input from the user. The shape information acquisition unit 401 acquires shape information indicating a shape of a surface of an object. The shape information acquisition unit 401 according to the present exemplary embodiment acquires height data indicating a distribution of a height $h(x, y)$ of the surface of the object. The height data is data associated with image data acquired by the image information acquisition unit 402 and holding the height of the surface of the object at each pixel position in an image indicated by the image data. The shape information acquisition unit 401 acquires height data generated in advance from a storage device such as the HDD 313. The height data is generated in advance by utilizing a phase shift method using a projection pattern in which a luminance is periodically changed, a triangulation method using a laser range finder, or the like. The image information acquisition unit 402 acquires the image data captured by imaging the object. The image information acquisition unit 402 according to the present exemplary embodiment acquires a plurality of pieces of image data captured by imaging the object while changing positions and orientations of a light source and the imaging device 311 from the storage device such as the HDD 313. $I_n(x, y)$ represents a pixel value in the image indicated by the image data. In this case, n is an identification number of the captured image, and numbers of 1 to c are assigned to c pieces of captured images, respectively. The image data in the present exemplary embodiment is grayscale image data, and the pixel value is a luminance value calculated from a red (R) value, a green (G) value, and a blue (B) value with use of a known method. In the present exemplary embodiment, the image information acquisition unit 402 acquires eight pieces of image data, but the number of acquired pieces of image data is not limited to eight as long as the number is sufficient to calculate a parameter indicating the reflection characteristic.

The imaging information acquisition unit 403 acquires an observation vector indicating a direction from the surface of the object toward the imaging device 311, a light source vector indicating a direction from the surface of the object toward the light source, and an illumination intensity indicating an intensity of light emitted from the light source. The imaging information acquisition unit 403 according to the present exemplary embodiment acquires an observation vector $v_n$, an illumination vector $l_n$, and an illumination intensity $s_n$ corresponding to each of the captured images. The reflection characteristic estimation unit 404 estimates the reflection characteristic of the object by fitting the reflection model to the observed values. The reflection characteristic estimation unit 404 includes a differential value calculation unit 405, a reference range determination unit 406, and a parameter calculation unit 407. The differential value calculation unit 405 calculates a normal differential value h"(x, y), which is a differential value of a normal line to the height h(x, y) indicated by the height data. The reference range determination unit 406 determines a range to be referred to in the estimation of the reflection characteristic at each pixel position based on the normal differential value h"(x, y), the pixel value $I_n$(x, y) in the captured image, the observation vector $v_n$, the light source vector $l_n$, and the illumination intensity $s_n$. The parameter calculation unit 407 calculates a reflection characteristic parameter p(x, y) based on the pixel value $I_n$(x, y) in the captured image, the observation vector $v_n$, the illumination vector $l_n$, the illumination intensity $s_n$, and the reference range determined by the reference range determination unit 406.

<Processing Performed by Image Processing Apparatus 1>

Figure 5:
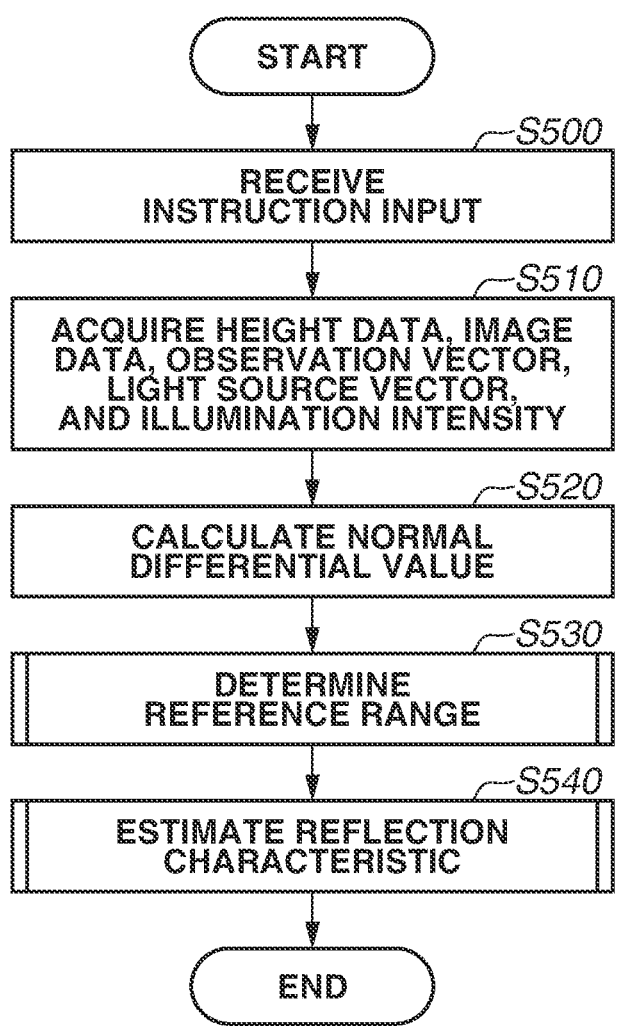
FIG. 5 is a flowchart illustrating processing performed by the image processing apparatus.

FIG. 5 is a flowchart of processing performed by the image processing apparatus 1. In the following description, details of the processing performed by the image processing apparatus 1 will be described with reference to FIG. 5. The following processing is started when an instruction to start the processing is received from the user. Hereinafter, each step (process) is indicated with "S" added at the head of a step number.

Figure 6:
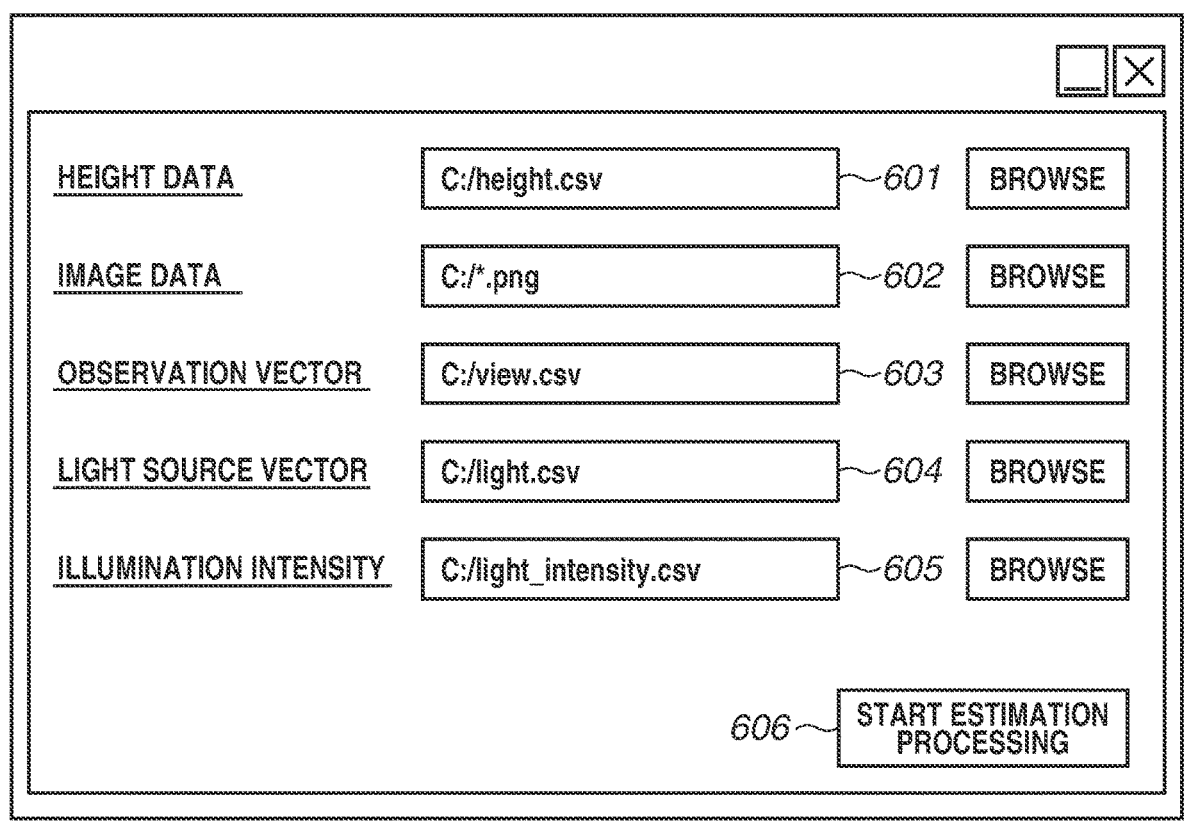
FIG. 6 illustrates one example of a graphical user interface (GUI).

In step S500, the input reception unit 400 displays the GUI on the display 315, and receives the instruction input from the user. FIG. 6 illustrates the GUI displayed in step S500. A specifying portion 601 is a region for specifying the shape information that the shape information acquisition unit 401 acquires. A specifying portion 602 is a region for specifying the image data that the image information acquisition unit 402 acquires. A specifying portion 603, a specifying portion 604, and a specifying portion 605 are regions for specifying the observation vector $v_n$, the light source vector $l_n$, and the illumination intensity $s_n$ that the imaging information acquisition unit 403 acquires. When the user does an input to each of the specifying portions with use of the input device 310 and presses an estimation processing start button 606, processing in step S510 and subsequent steps is started.

In step S510, the shape information acquisition unit 401 acquires the shape information specified by the user. More specifically, the shape information acquisition unit 401 acquires the height data indicating the distribution of the height h(x, y) of the surface of the object. Further, the image information acquisition unit 402 acquires the image data specified by the user. More specifically, the image information acquisition unit 402 acquires the plurality of pieces of image data acquired by imaging the object while changing the positions and the orientations of the light source and the imaging device 311. Further, the imaging information acquisition unit 403 acquires the observation vector $v_n$ indicating the direction from the surface of the object toward the imaging device 311, the light source vector $l_n$ indicating the direction from the surface of the object toward the light source, and the illumination intensity $s_n$ indicating the intensity of the light emitted from the light source that are specified by the user.

In step S520, the differential value calculation unit 405 calculates the normal differential value h"(x, y) indicating a change in the normal line on the surface of the object based on the height data acquired in step S510. More specifically, first, the differential value calculation unit 405 calculates the normal line h'(x, y) with respect to the height h(x, y) at each pixel in the height data with use of equation (1).

$$h'(x, y) = \frac{n(x, y)}{|n(x, y)|} \quad (1)$$

$$n(x, y) = [-h_x(x, y), -h_y(x, y), 1]^T$$

In equation (1), |n(x, y)| represents a magnitude of a normal vector. Then, $h_x$(x, y) and $h_y$(x, y) are values acquired by partially differentiating the height h(x, y) in each of an x direction and a y direction, and are calculated with use of equation (2) and equation (3) where d represents a width per pixel.

$$h_x(x, y) = \frac{h(x+1, y) - h(x-1, y)}{2d} \quad (2)$$

$$h_y(x, y) = \frac{h(x, y+1) - h(x, y-1)}{2d} \quad (3)$$

Next, the differential value calculation unit 405 calculates the normal differential value h"(x, y) with use of an equation (4) based on the calculated normal line h'(x, y).

$$h"(x,y)=[h_x'(x,y),h_y'(x,y)]^T \quad (4)$$

In equation (4), $h_x'$(x, y) and $h_y'$(x, y) are values acquired by calculating inner products of the normal line h'(x, y) and normal lines at pixels adjacent in the x direction and the y direction, and are calculated with use of equation (5) and equation (6), respectively.

$$h_x'(x,y)=h'(x+1,y)^T h'(x,y) \quad (5)$$

$$h_y'(x,y)=h'(x,y+1)^T h'(x,y) \quad (6)$$

In this manner, the differential value calculation unit 405 calculates the normal differential value h"(x, y) indicating a spatial angular change in the normal line. In equations (1) and (4) to (6), T represents a transposed matrix.

In step S530, the reference range determination unit 406 determines the range to be referred to in the estimation of the reflection characteristic at each pixel position based on the normal differential value h"(x, y), the pixel value $I_n$(x, y), the observation vector $v_n$, the illumination vector $l_n$, and the illumination intensity $s_n$. Details of processing for determining the reference range used in the estimation of the reflection characteristic will be described below.

In step S540, the parameter calculation unit 407 calculates the reflection characteristic parameter p(x, y) indicating the reflection characteristic of the object based on the pixel value $I_n$(x, y), the observation vector $v_n$, the illumination vector $l_n$, the illumination intensity $s_n$, and the reference range determined by the reference range determination unit 406. Details of processing for calculating the reflection characteristic parameter p(x, y) will be described below.

<Processing for Determining Reference Range Used in Estimation of Reflection Characteristic (S530)>

Figure 7:
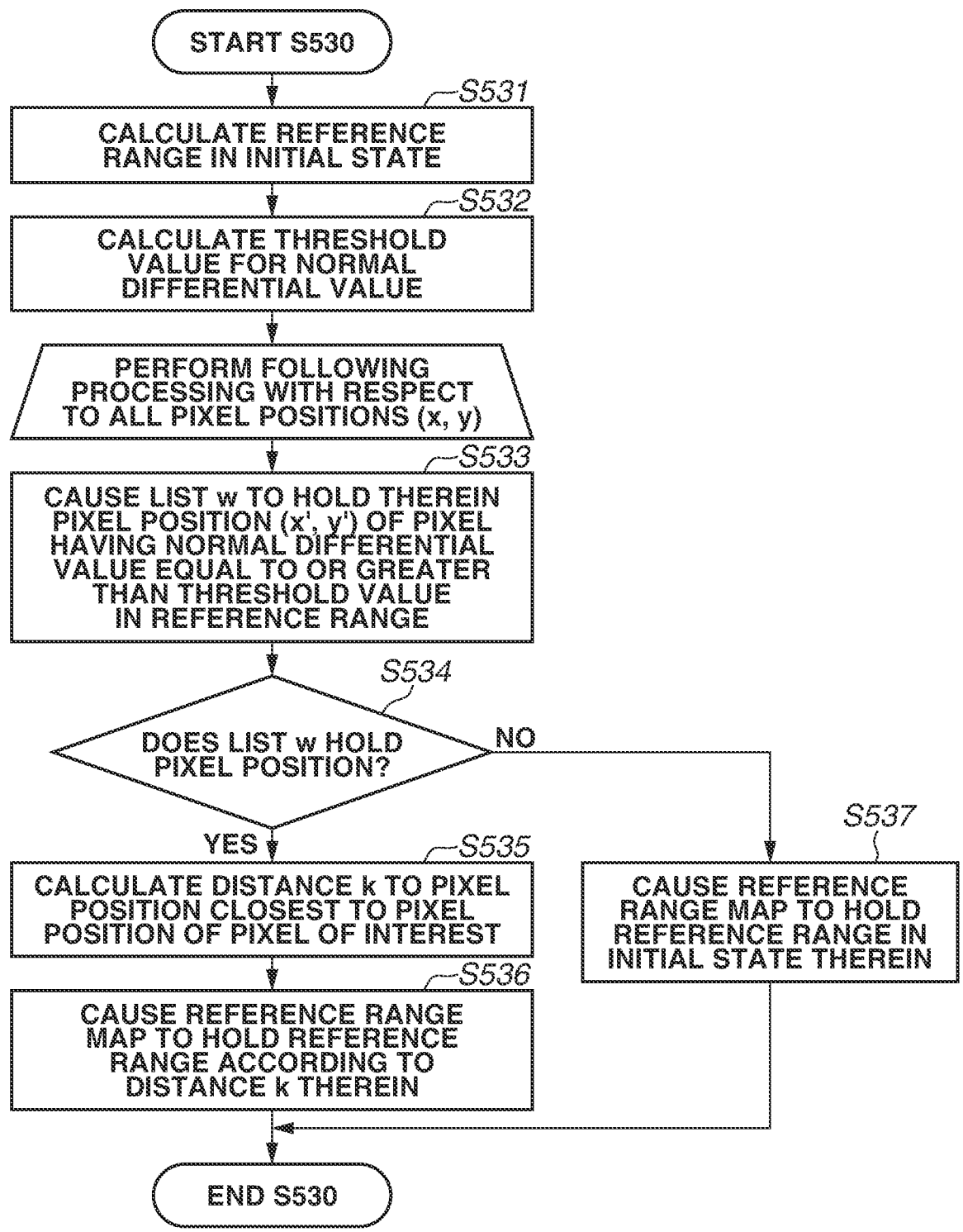
FIG. 7 is a flowchart illustrating processing for calculating the reference range of observed values.

In step S530, the reference range determination unit 406 determines the range to be referred to in the estimation of the reflection characteristic at a pixel of interest. More specifically, the reference range determination unit 406 calculates a width of the range to be referred to in estimating the reflection characteristic at the pixel of interest, and causes it to be held at the same pixel position as the pixel of interest in a reference range map. The reference range map is the data holding a width $r_e(x, y)$ of the reference range at each pixel. FIG. 7 is a flowchart illustrating the processing for determining the reference range. In the following description, the processing for determining the reference range in step S530 will be described with reference to FIG. 7.

In step S531, the reference range determination unit 406 calculates a width $r_d$ of the reference range in an initial state (default). The reference range $r_d \times r_d$ is a maximum reference range set when a shape at a position of interest on the object is similar to a shape around it, like the reference range A illustrated in FIG. 1. As the reference range increases, more observed values can be used to estimate the reflection characteristic, and the reflection characteristic parameter can be calculated more robustly against noise. However, in this case, a spatial resolution of the acquired reflection characteristic undesirably reduces relative to the captured image, and therefore an appropriate reference range should be set. Therefore, the maximum reference range is set based on a visible resolution with respect to the reflection characteristic in consideration of a human visual characteristic. It is known that a visible resolution with respect to a color is 300 dpi on the condition that the color of the object is observed from a position 30 cm away from it. On the other hand, a visible resolution with respect to glossiness and reflected light is lower than the visible resolution with respect to the color, and therefore the reference range $r_d$ in the initial state is calculated with 150 dpi set as the visible resolution in the present exemplary embodiment. Then, assuming that d represents the spatial width of one pixel in the captured image (a unit thereof is mm), the width rd of the reference range in the initial state is calculated with use of equation (7).

$$r_d = \frac{150}{25.4d} \qquad (7)$$

In step S532, the reference range determination unit 406 calculates a threshold value $T_{h''}$ for the normal differential value $h''(x, y)$ calculated in step S520. The normal differential value $h''(x, y)$ indicates the spatial angular change in the normal line. Therefore, a pixel holding an observed value leading to generation of an error at the time of the estimation of the reflection characteristic can be identified by finding out a pixel at which the angle of the normal line considerably is changed relative to the angle of the normal line at the pixel of interest based on the normal differential value $h''(x, y)$. Now, in a case where the reflection characteristic is estimated, the error generated due to the change in the shape of the surface will be described with reference to FIGS. 8A to 8F. FIG. 8A illustrates an example of reflection on a surface of an object which has normal lines at angles $\theta_a$ and $\theta_b$ within the reference range, and causes specular reflected light therefrom to spread widely. FIG. 8B illustrates a result of plotting the observed intensities with respect to an output angle of the light regarding the object illustrated in FIG. 8A. The object illustrated in FIG. 8A exhibits peaks of observed values at angles $2\theta_a$ and $2\theta_b$, which are conditions for the specular reflection, but a difference between the angles at which the observed values hit the peaks does not significantly affect the fitting of the reflection model because the reflected light spreads widely. It can be seen that estimated values of the reflection characteristic acquired from the fitting of the reflection model illustrated in FIG. 8B are shaped in conformity with the spread of the observed values. Further, FIG. 8C illustrates a result of plotting only the observed values on the surface having the normal line at the angle $\theta_a$, but can be deemed as a distribution spreading in a similar manner to the observed values within the reference range illustrated in FIG. 8B.

FIG. 8D illustrates an example of reflection on a surface of an object that has the normal lines at the angles $\theta_a$ and $\theta_b$ within the reference range and causes the specular reflected light therefrom to spread narrowly. FIG. 8E illustrates a result of plotting the observed intensities with respect to the output angle of the light regarding the object illustrated in FIG. 8D. The object illustrated in FIG. 8D exhibits peaks of observed values at the angles $2\theta_a$ and $2\theta_b$, which are the condition for the specular reflection. Fitting the reflection model to these observed intensities undesirably results in estimated values spreading more widely than the actual reflection as illustrated in FIG. 8E. FIG. 8F illustrates a result of plotting only the observed values on the surface having the normal line at the angle $\theta_a$. By fitting the reflection model to the observed values illustrated in FIG. 8F, estimated values can be acquired which spread in a similar manner to the spread of the actual reflected light.

As indicated in the above-described examples, a magnitude of the angular change in the normal line that generates the error in estimating the reflection characteristic is determined according to how the reflected light spreads on the surface of the object. Therefore, the reference range determination unit 406 calculates the threshold value $T_{h''}$ for the normal differential value $h''(x, y)$ to identify the pixel holding the observed value which leads to the generation of the estimation error, based on the spread of the reflected light on the object. The spread of the reflected light is variance of the observed values at a position where the angular change in the normal line is minimized in the reference range $r_d \times r_d$. First, the reference range determination unit 406 calculates a position $(x_m, y_m)$ at which the angular change in the normal line is minimized based on the normal differential value $h''(x, y)$ with use of equation (8).

$$(x_m, y_m) = \underset{x,y}{\operatorname{argmin}} \sum_{\substack{x-\frac{r_d}{2} \leq i \leq x+\frac{r_d}{2} \\ y-\frac{r_d}{2} \leq j \leq y+\frac{r_d}{2}}} h''(i, j)^2 \qquad (8)$$

In equation (8), $\operatorname{argmin}_{x,y} \Sigma h''(i, j)^2$ is a function that returns parameters x and y which minimize $\Sigma h''(i, j)^2$. Next, the reference range determination unit 406 calculates the variance $\sigma_m^2$ of the observed value at the position $(x_m, y_m)$ with use of equation (9).

$$\sigma_m^2 = \underset{\sigma^2, \mu, s}{\operatorname{argmin}} \sum_{\substack{x-\frac{r_d}{2} \leq i \leq x+\frac{r_d}{2} \\ y-\frac{r_d}{2} \leq j \leq y+\frac{r_d}{2} \\ 1 \leq n \leq c}} \left( G(\sigma^2, \mu, s, v_n, l_n) - \frac{I_n(i, j)}{s_n} \right)^2 \qquad (9)$$

In equation (9), $G(\sigma^2, \mu, s, v_n, l_n)$ is a Gaussian function of a mean $\mu$, a variance $\sigma^2$, and a scale s with respect to the observation vector $v_n$ and the illumination vector Next, the reference range determination unit 406 calculates the threshold value $T_{h''}$ based on the calculated variance $\sigma_m^2$ of the observed value with use of equation (10).

$$T_{h''} = \frac{\sqrt{\sigma_m^2}}{2} \quad (10)$$

The following processing from step S533 to step S537 is performed on all the pixel positions (x, y).

In step S533, the reference range determination unit 406 refers to the normal differential value h''(x, y) at each pixel within the reference range $r_d \times r_d$ with respect to the pixel position (x, y) of the pixel of interest, and generates a list w holding all of pixel positions (x', y') which have a value equal to or greater than the threshold value $T_{h''}$.

In step S534, the reference range determination unit 406 determines whether the list w holds one or more pixel positions by referring to the list w generated in step S533. If the list w holds one or more pixel positions (YES in step S534), the processing proceeds to step S535. If the list w does not hold even a single pixel position (NO in step S534), the processing proceeds to step S537.

In step S535, the reference range determination unit 406 calculates a distance k to a pixel position that is the closest to the pixel position (x, y) of the pixel of interest among the pixel positions (x', y') held in the list w generated in step S533 with use of equation (11).

$$k = \min_i \sqrt{(x - x'_i)^2 + (y - y'_i)^2} \quad (11)$$

In equation (11), $(x'_i, y'_i)$ represents a pixel position held as the i-th item in the list w.

In step S536, the reference range determination unit 406 calculates the width $r_e(x, y)$ of the reference range to be used in the estimation of the reflection characteristic at the pixel of interest based on the distance k calculated in step S535. Further, the reference range determination unit 406 causes the calculated width $r_e(x, y)$ of the reference range to be held at the corresponding pixel in the reference range map. The reference range determination unit 406 calculates the width $r_e(x, y)$ of the reference range as indicated by equation (12) so as to set a rectangle having a width of $2k+1$ centering around the pixel of interest as the reference range.

$$r_e(x,y) = 2k+1 \quad (12)$$

In step S537, the reference range determination unit 406 sets the reference range $r_d$ in the initial state as the width $r_e(x, y)$ of the reference range used in estimating the reflection characteristic at the pixel of interest, and causes the reference range $r_d$ in the initial state to be held at the corresponding pixel in the reference range map.

$$r_e(x,y) = r_d \quad (13)$$

<Processing for Calculating Reflection Characteristic Parameter (S540)>

In step S540, the parameter calculation unit 407 estimates the reflection characteristic while changing the reference range of the observed values based on the pixel position of the pixel of interest based on the reference range map generated in step S530. FIG. 9 is a flowchart illustrating the processing for calculating the reflection characteristic parameter. In the following description, the processing for calculating the reflection characteristic parameter in step S540 will be described with reference to FIG. 9.

The following processing from step S541 to step S543 is performed on all the pixel positions (x, y).

In step S541, the parameter calculation unit 407 acquires the width $r_e(x, y)$ of the reference range at the pixel position (x, y) of the pixel of interest from the reference range map.

In step S542, the parameter calculation unit 407 calculates the reflection characteristic parameter by fitting the reflection model to the observed values within the reference range $r_e(x, y) \times r_e(x, y)$ in the captured image. Then, assuming that $f(p, v_n, l_n)$ represents the reflection model subjected to the fitting, the reflection characteristic parameter p(x, y) is calculated with use of equation (14). In equation (14), assume that r' represents the value of $r_e(x, y)$.

$$p(x, y) = \operatorname*{argmin}_p \sum_{\substack{x - \frac{r'}{2} \leq i \leq x + \frac{r'}{2} \\ y - \frac{r'}{2} \leq j \leq y + \frac{r'}{2} \\ 1 \leq n \leq c}} \left( f(p, v_n, l_n) - \frac{I_n(i, j)}{s_n} \right)^2 \quad (14)$$

In this case, p is a vector indicating a parameter group held by the reflection model $f(p, v_n, l_n)$, and the reflection model used in the present exemplary embodiment is a reflection model expressed by the Gaussian function having the three parameters, the mean, the variance, and the scale.

In step S543, the parameter calculation unit 407 causes the reflection characteristic parameter p(x, y) calculated in step S542 to be held at the pixel located at the pixel position (x, y) in reflection characteristic data. Now, the reflection characteristic data refers to data holding the reflection characteristic parameter at each pixel. A plurality of parameters may be held at each pixel in one piece of reflection characteristic data, or the reflection characteristic data may be generated as pieces of data holding respective parameters at each pixel, like mean data, variance data, and scale data.

The reflection characteristic data generated by the processing in step S540 is output to the storage device such as the HDD 313. A destination to which the reflection characteristic data is output is not limited to the storage device, and may be, for example, another device that performs processing on the reflection characteristic data.

<Advantageous Effects of First Exemplary Embodiment>

In the above-described manner, the image processing apparatus 1 according to the present exemplary embodiment acquires the shape information indicating the shape of the surface of the object. The image processing apparatus 1 acquires the plurality of pieces of image data acquired by imaging the object under the plurality of geometric conditions. The image processing apparatus 1 determines the pixel position corresponding to the position where the orientation of the surface is the same as or similar to the orientation of the surface at the position of interest on the object, as the pixel position for estimating the reflection characteristic of the object at the position of interest, in the plurality of images indicated by the plurality of image data based on the shape information. The image processing apparatus 1 estimates the reflection characteristic of the object at the position of interest by using the pixel value at the determined pixel position. Thus, the image processing apparatus 1 can estimate the reflection characteristic of the object with use of the observed value suitable for the reflection model.

In the following description, a second exemplary embodiment will be described. In the first exemplary embodiment, the image processing apparatus 1 changes the range to be referred to in the estimation of the reflection characteristic for each pixel position, based on the shape of the surface of the object. In the present exemplary embodiment, an image processing apparatus selects a pixel having a normal direction similar to the normal direction at the pixel of interest, from the pixels contained in the reference range while keeping the reference range for each pixel position fixed, and calculates the reflection characteristic parameter with use of the selected pixel. The image processing apparatus according to the present exemplary embodiment has a similar hardware configuration to the hardware configuration of the first exemplary embodiment, and therefore a description thereof will be omitted here. In the following description, the present exemplary embodiment will be described mainly focusing on differences between the present exemplary embodiment and the first exemplary embodiment. Similar configurations will be described while using the same reference numerals.

<Logical Configuration of Image Processing Apparatus 1>

Figure 10:
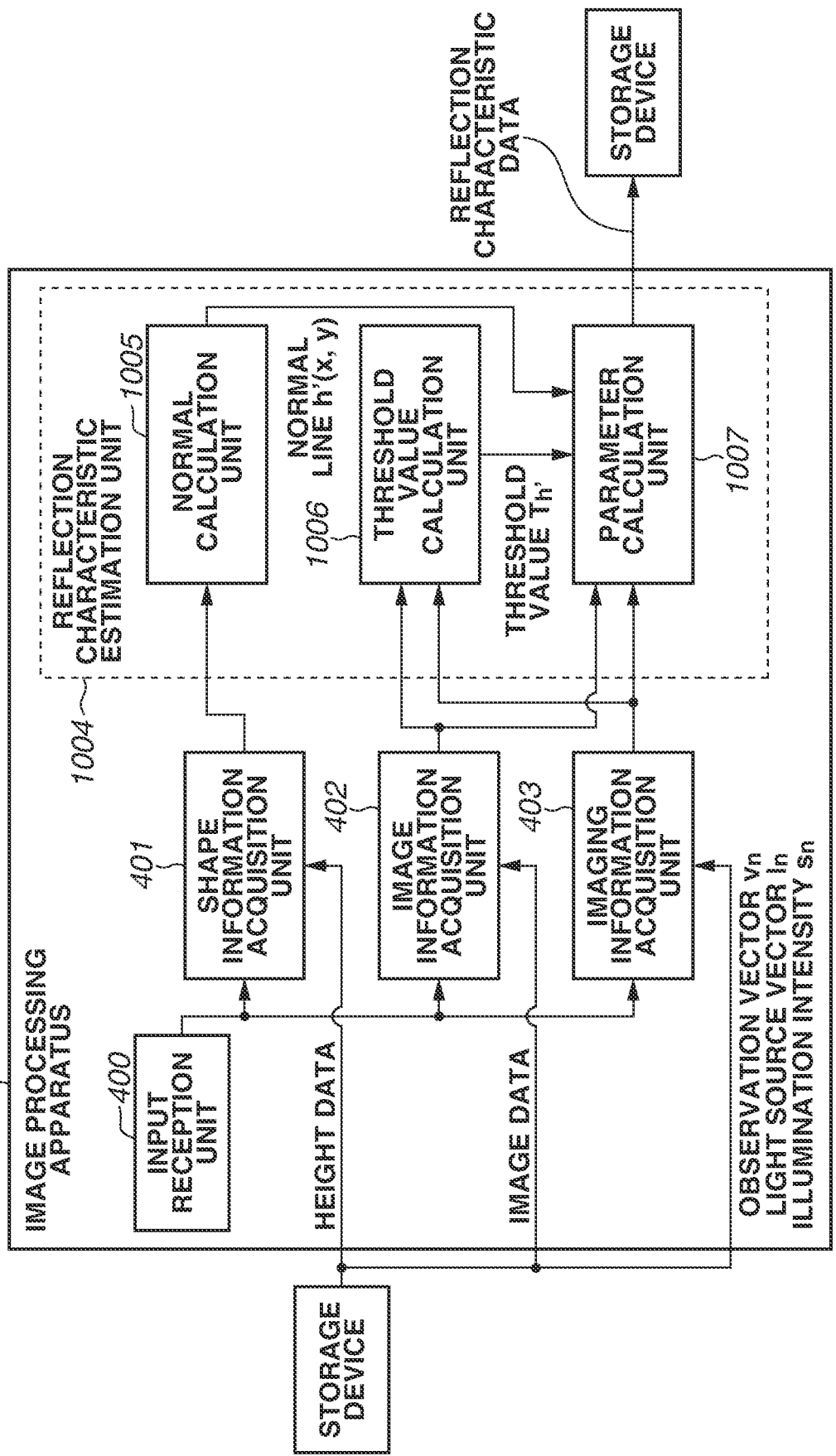
FIG. 10 is a block diagram illustrating a logical configuration of an image processing apparatus.

FIG. 10 is a block diagram illustrating a logical configuration of the image processing apparatus 1. The CPU 301 executes the program stored in the ROM 302 with use of the RAM 303 as the work memory therefor, so that which the image processing apparatus 1 functions as the logical configuration illustrated in FIG. 10. The processing that will be described below does not have to be entirely performed by the CPU 301, and the image processing apparatus 1 may be configured in such a manner that a part or a whole of the processing is performed by one or a plurality of processing circuits other than the CPU 301.

The image processing apparatus 1 includes the shape information acquisition unit 401, the image information acquisition unit 402, the imaging information acquisition unit 403, and a reflection characteristic estimation unit 1004. The shape information acquisition unit 401, the image information acquisition unit 402, and the imaging information acquisition unit 403 according to the present exemplary embodiment have similar functions to the shape information acquisition unit 401, the image information acquisition unit 402, and the imaging information acquisition unit 403 according to the first exemplary embodiment, and therefore descriptions thereof will be omitted here. The reflection characteristic estimation unit 1004 estimates the reflection characteristic of the object by fitting the reflection model to the observed values. The reflection characteristic estimation unit 1004 includes a normal calculation unit 1005, a threshold value calculation unit 1006, and a parameter calculation unit 1007. The normal calculation unit 1005 calculates the normal line h'(x, y) with respect to the height h(x, y) indicated by the height data. The threshold value calculation unit 1006 calculates a threshold value $T_{h'}$ for the normal line h'(x, y) based on the pixel value $I_n(x, y)$ in the captured image, the observation vector $v_n$, the light source vector L, and the illumination intensity $s_n$. The parameter calculation unit 1007 calculates the reflection characteristic parameter p(x, y) based on the pixel value $I_n(x, y)$ in the captured image, the observation vector $v_n$, the light source vector $l_n$, the illumination intensity $s_n$, the normal line h'(x, y), and the threshold value $T_{h'}$.

<Processing Performed by Image Processing Apparatus 1>

Figure 11:
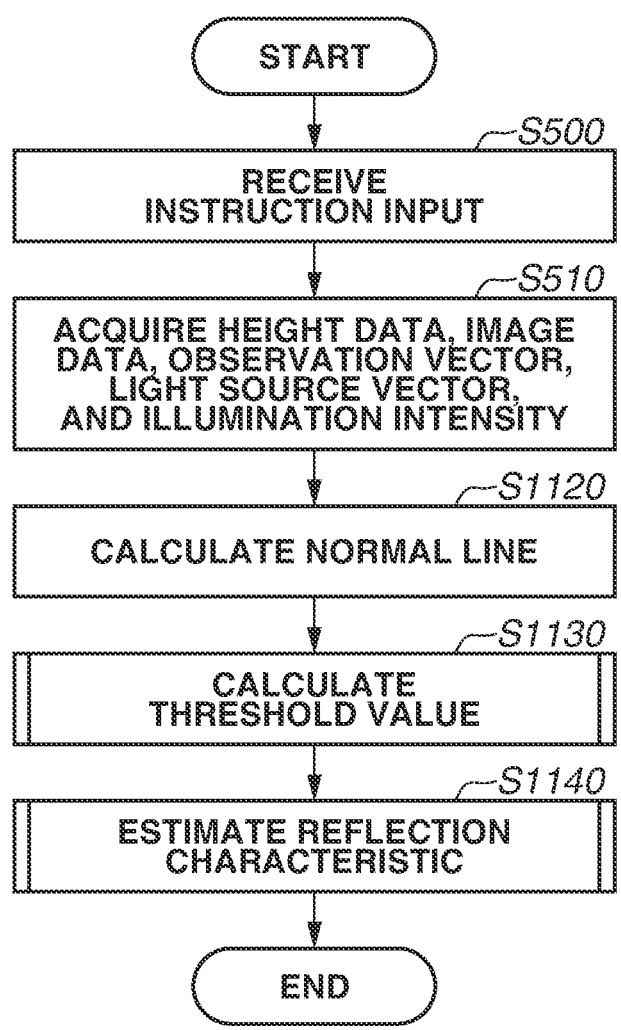
FIG. 11 is a flowchart illustrating processing performed by the image processing apparatus.

FIG. 11 is a flowchart of processing performed by the image processing apparatus 1. In the following description, details of the processing performed by the image processing apparatus 1 will be described with reference to FIG. 11. The following processing is started when an instruction to start the processing is received from the user. Hereinafter, each step (process) is indicated with "S" added at the head of a step number. Processing in step S500 and step S510 according to the present exemplary embodiment is similar to the processing in step S500 and step S510 according to the first exemplary embodiment, and therefore a description thereof will be omitted here.

In step S1120, the normal calculation unit 1005 calculates the normal line h'(x, y) on the surface of the object based on the height data acquired in step S510. The normal line h'(x, y) is calculated based on equation (1) described in the first exemplary embodiment. In step S1130, the threshold value calculation unit 1006 calculates the threshold value $T_{h'}$ for the normal line h'(x, y) calculated in step S1120 based on the pixel value $I_n(x, y)$ in the captured image, the observation vector $v_n$, the light source vector $l_n$, and the illumination intensity $s_n$. Details of processing for calculating the threshold value $T_{h'}$ will be described below. In step S1140, the parameter calculation unit 1007 calculates the reflection characteristic parameter p(x, y) based on the pixel value $I_n(x, y)$ in the captured image, the observation vector $v_n$, the light source vector $l_n$, the illumination intensity $s_n$, the normal line h'(x, y), and the threshold value $T_{h'}$. Details of processing for calculating the reflection characteristic parameter p(x, y) will be described below.

<Processing for Calculating Threshold Value $T_{h'}$ (S1130)>

In step S1130, the threshold value calculation unit 1006 calculates the threshold value $T_{h'}$ for the normal line h'(x, y) calculated in step S1120 based on the pixel value $I_n(x, y)$ in the captured image, the observation vector $v_n$, the light source vector $l_n$, and the illumination intensity $s_n$. Herein, the pixel holding the observed value leading to the generation of the estimation error is identified based on the spread of the reflected light on the object similarly to the first exemplary embodiment. The spread of the reflected light is the variance of the observed value at the position where the angular change in the normal line is minimized in the reference range $r_d \times r_d$. First, the threshold value calculation unit 1006 calculates the width $r_d$ of the reference range in the initial state based on equation (7). Next, the threshold value calculation unit 1006 calculates the position $(x_m, y_m)$ at which the angular change in the normal line is minimized based on the normal line h'(x, y) with use of equation (15).

$$(x_m, y_m) = \underset{x,y}{\operatorname{argmin}} \sum_{\substack{x-\frac{r_d}{2} \leq i \leq x+\frac{r_d}{2} \\ y-\frac{r_d}{2} \leq j \leq y+\frac{r_d}{2}}} h'(x, y)^T h'(i, j) \qquad (15)$$

In equation (15), $h'(x, y)^T h'(i, j)$ indicates an inner product of the normal vector at the position (x, y) and a normal vector at a position (i, j). Next, the threshold value calculation unit 1006 calculates the variance $\sigma_m^2$ of the observed value at the position $(x_m, y_m)$ with use of equation (9). Next, the threshold value calculation unit 1006 calculates the threshold value $T_{h'}$ based on the calculated variance $\sigma_m^2$ of the observed value with use of equation (16).

$$T_{h'} = \frac{\sqrt{\sigma_m^2}}{2} \qquad (16)$$

<Processing for Calculating Reflection Characteristic Parameter (S1140)>

Figure 12:
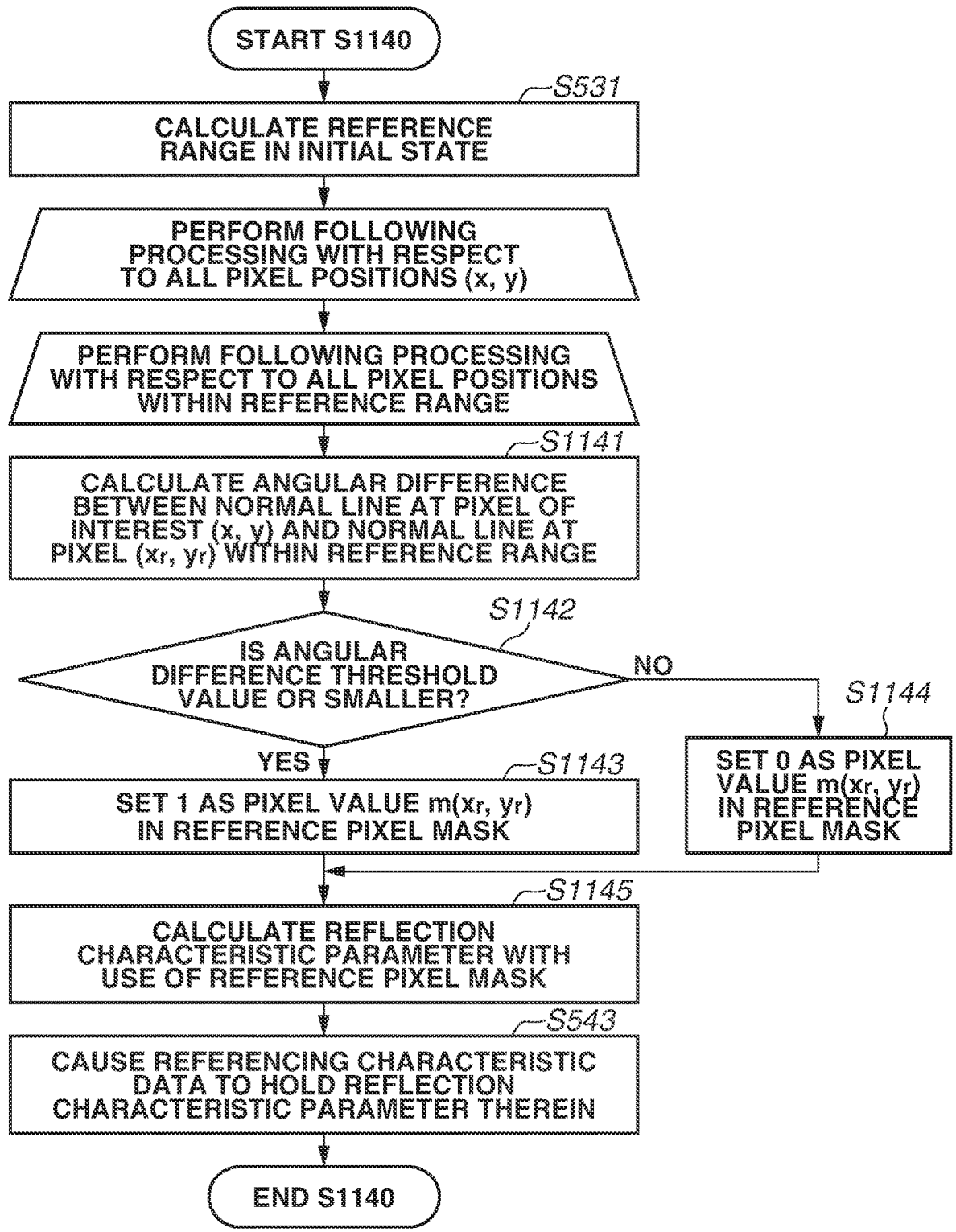
FIG. 12 is a flowchart illustrating processing for estimating the reflection characteristic.

In step S1140, the parameter calculation unit 1007 selects the pixel having the observed value to be used in estimating the reflection characteristic from the pixels within the reference range based on the threshold value $T_{h'}$ calculated in step S1130, and calculates the reflection characteristic parameter with use of the observed value at the selected pixel. FIG. 12 is a flowchart illustrating the processing for calculating the reflection characteristic parameter. In the following description, the processing for calculating the reflection characteristic parameter in step S1140 will be described with reference to FIG. 12.

In step S531, the parameter calculation unit 1007 calculates the width rd of the reference range in the initial state. The processing is similar to the first exemplary embodiment, and therefore a description thereof will be omitted here. The following processing from step S1141 to step S1145 and step S543 is performed on all the pixel positions (x, y).

The following processing from step S1141 to step S1144 is performed on all of pixel positions $(x_r, y_r)$ within the reference range $r_d \times r_d$ centering around the pixel position (x, y) of the pixel of interest, with respect to the pixel of interest. As a result, a reference pixel mask corresponding to the pixel of interest is generated. The reference pixel mask is binary data for identifying the pixel referred to in estimating the reflection characteristic, and a pixel position having 1 as a pixel value $m(x_r, y_r)$ is referred to while a pixel position having 0 as the pixel value $m(x_r, y_r)$ is not referred to. In step S1141, the parameter calculation unit 1007 calculates an angular difference e between the normal line h'(x, h) at the pixel position (x, y) of the pixel of interest and the normal line $h'(x_r, y_r)$ at the pixel position $(x_r, y_r)$ within the reference range $r_d \times r_d$. The angular difference e between the normal lines is calculated as an inner product of the normal vectors as indicated by equation (17).

$$e = h'(x,y)^T h'(x_r, y_r) \quad (17)$$

In equations (15) and (17), T represents the transposed matrix.

In step S1142, the parameter calculation unit 1007 determines whether the angular difference e calculated in step S1141 is equal to the threshold value $T_{h'}$ or smaller. If the angular difference e is equal to the threshold value $T_{h'}$ or smaller (YES in step S1142), the processing proceeds to step S1143. If the angular difference e is larger than the threshold value $T_{h'}$ (NO in step S1142), the processing proceeds to step S1144. In step S1143, the parameter calculation unit 1007 sets 1 as the pixel value $m(x_r, y_r)$ at the pixel position $(x_r, y_r)$ in the reference pixel mask to refer to the pixel position at which the angular difference e between the normal lines is equal to the threshold value $T_{h'}$ or smaller, in estimating the reflection characteristic. In step S1144, the parameter calculation unit 1007 sets 0 as the pixel value $m(x_r, y_r)$ at the pixel position $(x_r, y_r)$ in the reference pixel mask to prohibit referring to the pixel position at which the angular difference e between the normal lines is larger than the threshold value $T_{h'}$, in estimating the reflection characteristic.

In step S1145, the parameter calculation unit 1007 selects the observed values to be referred to based on the reference pixel mask generated by the processing from step S1141 to step S1144, and fits the reflection model to the observed values. Herein, assuming that $f(p, v_n, l_n)$ represents the reflection model to be subjected to the fitting, the reflection characteristic parameter p(x, y) is calculated with use of equation (18).

$$p(x, y) = \underset{p}{\operatorname{argmin}} \sum_{\substack{x - \frac{r_d}{2} \leq i \leq x + \frac{r_d}{2} \\ y - \frac{r_d}{2} \leq j \leq y + \frac{r_d}{2} \\ 1 \leq n \leq c}} m(i, j) \left( f(p, v_n, l_n) - \frac{l_n(i, j)}{s_n} \right)^2 \quad (18)$$

Herein, p is the vector indicating the parameter group held by the reflection model $f(p, v_n, l_n)$, and the reflection model used in the present exemplary embodiment is a model expressed by the Gaussian function having the three parameters, the mean, the variance, and the scale.

In step S543, the parameter calculation unit 407 causes the reflection characteristic parameter p(x, y) calculated in step S542 to be held at the pixel located at the pixel position (x, y) in the reflection characteristic data. The reflection characteristic data generated by the processing in step S1140 is output to the storage device such as the HDD 313.

<Advantageous Effects of Second Exemplary Embodiment>

In the above-described manner, the image processing apparatus 1 according to the present exemplary embodiment selects the pixel having the normal direction similar to the normal direction at the pixel of interest, from the pixels within the predetermined reference range centering around the pixel of interest. The image processing apparatus 1 calculates the reflection characteristic parameter indicating the reflection characteristic of the object by fitting the reflection model to the observed value at the selected pixel. Thus, the image processing apparatus 1 can calculate the reflection characteristic parameter at the pixel of interest without using the observed value of a pixel having a normal direction significantly different from the normal direction at the pixel of interest. Further, the image processing apparatus 1 estimates the reflection characteristic without changing the reference range for each pixel position, and therefore can calculate the reflection characteristic parameter while keeping constant the spatial resolution of the estimated reflection characteristic.

Other Exemplary Embodiments

In the above-described exemplary embodiments, the grayscale image data is used as the image data, but the image data may be color image data. In this case, the image processing apparatus 1 may perform the above-described processing on each of the R value, the G value, and the B value, and estimate the reflection characteristic according to a corresponding wavelength band. The color information is not limited to the R value, the G value, and the B value, and may be L*a*b* values or the like.

In the above-described exemplary embodiments, the reference range used in the estimation of the reflection characteristic is a range having a length and a width equal to each other, but the length and the width may be different from each other.

In the above-described exemplary embodiments, the shape information acquisition unit 401 acquires the height data as the shape information, but the shape information is not limited to the above-described one example. For example, normal line data holding a normal vector calculated in advance based on the height indicated by the height data at each pixel may be acquired as the shape information. In this case, the normal line based on the height data does not have to be calculated.

In the above-described exemplary embodiments, the image processing apparatus 1 performs the processing on each of the pixels, but may determine whether to perform the processing for selecting the observed value to be used in estimating the reflection characteristic for each region having a predetermined size. More specifically, the image processing apparatus 1 calculates an angular difference between a maximum normal direction and a minimum normal direction for each region in the image. If the angular difference is larger than a predetermined threshold value, the image processing apparatus 1 uses the pixel value suitable for the reflection model among the pixels within the reference range in the initial state to carry out the fitting in a similar manner to the above-described processing. If the angular difference is equal to the predetermined threshold value or smaller, the image processing apparatus 1 uses the pixel values of all of the pixels within the reference range in the initial state for the fitting.

In the above-described exemplary embodiments, the image processing apparatus 1 calculates the reference range in the initial state based on the visible resolution with respect to the reflection characteristic, but the method for acquiring the reference range in the initial state is not limited to the above-described one example. For example, the image processing apparatus 1 may set in advance a resolution according to an output device that does an output based on the reflection characteristic data generated in the present exemplary embodiments, and calculate the reference range in the initial state based on the set resolution. Alternatively, the input reception unit 400 or the like may receive a spatial resolution desired by the user, and the image processing apparatus 1 may calculate the reference range in the initial state based on the received spatial resolution.

In the above-described exemplary embodiments, the image processing apparatus 1 calculates the threshold value for determining the reference pixel in estimating the reflection characteristic with use of the reflection characteristic at the pixels within the reference range, but the method for acquiring the threshold value is not limited to the above-described one example. For example, the image processing apparatus 1 may calculate the threshold value with use of a reflection characteristic according to the output device that does an output based on the reflection characteristic data generated in the present exemplary embodiments. Alternatively, the image processing apparatus 1 may set a value input by the user as the threshold value.

In the above-described exemplary embodiments, the image processing apparatus 1 employs the reflection model expressed by the Gaussian function as the reflection model used in estimating the reflection characteristic, but may estimate the reflection characteristic with use of other reflection models such as the Torrance-Sparrow model and the Phong model.

According to one aspect of the embodiments, the reflection characteristic of the object can be estimated with use of the observed value suitable for the reflection model.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-142032, filed Jul. 30, 2018, which is hereby incorporated by reference herein in its entirety.

What is claimed is:

1. An image processing apparatus comprising:
a first acquisition unit configured to acquire shape information indicating a shape of a surface of an object;
a second acquisition unit configured to acquire a plurality of pieces of image data acquired by imaging the object under a plurality of geometric conditions;
a determination unit configured to determine a pixel position corresponding to a position at which a surface orientation is the same as or similar to a surface orientation at a position of interest on the object, for estimating a reflection characteristic of the object at the position of interest, in a plurality of images indicated by the plurality of pieces of image data, based on the shape information; and
an estimation unit configured to estimate the reflection characteristic of the object at the position of interest by fitting a reflection model to a pixel value at the pixel position determined by the determination unit.

2. The image processing apparatus according to claim 1, wherein the second acquisition unit acquires N pieces of image data,
wherein each of images indicated by the N pieces of image data includes M neighboring pixels around a pixel of interest, and
wherein the estimation unit estimates the reflection characteristic with use of N pixel values of the pixels of interest in each of the images indicated by the N pieces of image data, and N×M pixel values of the neighboring pixels.

3. The image processing apparatus according to claim 1, wherein the geometric conditions are conditions with respect to irradiation with light and reception of the light reflected on the object irradiated with the light.

4. The image processing apparatus according to claim 1, wherein the shape information is height data indicating a height of the surface of the object.

5. The image processing apparatus according to claim 1, wherein the shape information is normal line data indicating a direction of a normal line on the surface of the object.

6. The image processing apparatus according to claim 1, further comprising a third acquisition unit configured to acquire imaging information indicating an observation vector indicating a direction from the surface of the object toward an imaging device, a light source vector indicating a direction from the surface of the object toward a light source, and an illumination intensity indicating an intensity of light emitted from the light source,
wherein the estimation unit estimates the reflection characteristic of the object based on the imaging information.

7. The image processing apparatus according to claim 1, wherein the determination unit determines a range from which the pixel value for fitting the reflection model is acquired in the plurality of images indicated by the plurality of pieces of image data.

8. The image processing apparatus according to claim 7, wherein the determination unit calculates a value indicating a change in the direction of the normal line on the surface of the object based on the shape information, and determines the range based on the value indicating the change in the direction of the normal line.

9. The image processing apparatus according to claim 1, wherein the determination unit selects the pixel value at the position at which the orientation of the surface is similar to the orientation of the surface at the position of interest on the object in the plurality of images indicated by the plurality of pieces of image data based on the shape information, and
wherein the estimation unit fits the reflection model to the pixel value selected by the determination unit.

10. The image processing apparatus according to claim 9, wherein the determination unit selects a pixel value at a position having a normal line extending in a direction similar to a direction of a normal line at the position of interest on the object.

11. The image processing apparatus according to claim 10, wherein the determination unit selects a pixel value at a position having a normal line extending in such a direction that an angular difference thereof from the direction of the normal line at the position of interest on the object is a predetermined threshold value or smaller.

12. The image processing apparatus according to claim 9, wherein the determination unit selects a pixel value from pixel values in a range determined according to a visual characteristic in the plurality of images indicated by the plurality of pieces of image data.

13. The image processing apparatus according to claim 1, wherein the estimation unit calculates a parameter indicating the reflection characteristic of the object at the position of interest by using the pixel value determined by the determination unit, and outputs the calculated parameter.

14. The image processing apparatus according to claim 1, wherein the reflection model is a reflection model expressed by a Gaussian function.

15. The image processing apparatus according to claim 1, wherein the reflection model is a Torrance-Sparrow model.

16. An image processing apparatus comprising:
a first acquisition unit configured to acquire shape information indicating a shape of a surface of an object;
a second acquisition unit configured to acquire a plurality of pieces of image data acquired by imaging the object under a plurality of geometric conditions;
a determination unit configured to determine a pixel position corresponding to a position on the object that has a surface orientation the same as or similar to a surface orientation of a certain surface on the object, for estimating a reflection characteristic of the object corresponding to the surface orientation of the certain surface, in an image indicated by each of the plurality of pieces of image data, based on the shape information; and
an estimation unit configured to estimate the reflection characteristic of the object corresponding to the surface orientation of the certain surface by fitting a reflection model to a pixel value at the pixel position determined by the determination unit.

17. An image processing apparatus comprising:
a first acquisition unit configured to acquire shape information indicating a shape of a surface of an object;
a second acquisition unit configured to acquire a plurality of pieces of image data acquired by imaging the object under a plurality of geometric conditions; and
an estimation unit configured to estimate a reflection characteristic of the object by fitting a reflection model to based on the shape information and the plurality of pieces of image data,
wherein a pixel position used in fitting of the reflection model in each of images indicated by the plurality of pieces of image data varies according to the shape information.

18. An image processing method comprising:
acquiring shape information indicating a shape of a surface of an object as first acquiring;
acquiring a plurality of pieces of image data acquired by imaging the object under a plurality of geometric conditions as second acquiring;
determining a pixel position corresponding to a position at which a surface orientation is the same as or similar to a surface orientation at a position of interest on the object, for estimating a reflection characteristic of the object at the position of interest, in a plurality of images indicated by the plurality of pieces of image data, based on the shape information; and
estimating the reflection characteristic of the object at the position of interest by fitting a reflection model to a pixel value at the pixel position determined by the determining.

19. A non-transitory computer-readable storage medium storing instructions that, when executed by a computer, cause the computer to perform an image processing method, the image processing method comprising:
acquiring shape information indicating a shape of a surface of an object as first acquiring;
acquiring a plurality of pieces of image data acquired by imaging the object under a plurality of geometric conditions as second acquiring;
determining a pixel position corresponding to a position at which a surface orientation is the same as or similar to a surface orientation at a position of interest on the object, for estimating a reflection characteristic of the object at the position of interest, in a plurality of images indicated by the plurality of pieces of image data, based on the shape information; and
estimating the reflection characteristic of the object at the position of interest by fitting a reflection model to a pixel value at the pixel position determined by the determining.

* * * * *